(12) United States Patent
Schuetze

(10) Patent No.: US 6,907,562 B1
(45) Date of Patent: Jun. 14, 2005

(54) HYPERTEXT CONCORDANCE

(75) Inventor: Hinrich Schuetze, San Francisco, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/360,900

(22) Filed: Jul. 26, 1999

(51) Int. Cl.⁷ .......................... G06F 17/21; G06F 17/00; G06F 15/00
(52) U.S. Cl. ..................... 715/501.1; 715/531; 715/532
(58) Field of Search ............................. 707/501.1, 532, 707/531; 715/501.1, 532, 531

(56) References Cited

U.S. PATENT DOCUMENTS

| | | | | |
|---|---|---|---|---|
| 5,708,825 A | * | 1/1998 | Sotomayor | 707/501.1 |
| 5,848,410 A | * | 12/1998 | Walls et al. | 707/102 |
| 5,850,561 A | * | 12/1998 | Church et al. | 707/532 |
| 5,913,215 A | * | 6/1999 | Rubinstein et al. | 707/10 |
| 5,963,205 A | * | 10/1999 | Sotomayor | 707/531 |
| 6,565,611 B1 | * | 5/2003 | Wilcox et al. | 715/541 |

OTHER PUBLICATIONS

Internet Archive WayBack Machine—"http://www.archive.org", printed on Feb. 19, 2004, pp. 1–5.*
Internet Archive WayBack Machine—Search Results for the URL address <http://wombat.doc.ic.ac.uk/foldoc/contents/operatingsystem.html>, printed on Feb. 19, 2004, "http://web.archive.org/web/*/http://wombat.doc.ic.ac.uk/foldoc/contents/operatingsystem.html", p. 1.*
"Operating system from FOLDOC—Entry List", WayBack Machine date Jan. 21, 1998, <http://web.archive.org/web/19990121174423/http://wombat.doc.ic.ac.uk/foldoc/contents/operatingsystem.html>, p.2.*
"Amoeba from FOLDOC", WayBack Machine date Sep. 13, 1999 and published date May 7, 1997,<http://web.archive.org/web/19990913000305/wombat.doc.ic.ac.uk/foldoc.cgi?Amoeba>, p. 3.*
"Operating system from FOLDOC"—Entry List, WayBack Machine date May 3, 1999, <http://web.archive.org/web/19990503075131/http://wombat.doc.ic.ac.uk/foldoc/contents/operatingsystem.html>, pp. 4–5.*
"Operating system from FOLDOC", WayBack Machine date Mar. 10, 2000 and published date Jun. 9, 1999,<http://web.archive.org/web/2000310215744/wombat.doc.ic.ac.uk/foldoc/foldoc.cgi?operatingsystem>, P. 6.*
Lake, Matthew, "Words, words, words. (Microsoft Windows 3.1 Program Manager's on–line glossary of Windows terms) (Hot Tips) (Brief Article) (Tutorial)", Jan. 1, 1993, PC Computing, vol. 6 No. 1, p. 1.*
Powell, James E., "Anchorpage 1.0—Anchor's a Way for Web Docs", 1995, Windows Magazine, No. 614, p. 1.*

(Continued)

Primary Examiner—Joseph Feild
Assistant Examiner—Almari Yuan
(74) Attorney, Agent, or Firm—Fliesler Meyer LLP

(57) ABSTRACT

A system and method in accordance with an embodiment of the invention addresses the problems of unlinked or sparsely linked documents by linking them using a set of automatically extracted content words, the "index terms." Upon receiving a list of documents for indexing, the system and method in accordance with an embodiment of the invention automatically selects the terms to be indexed and generates a hypertext concordance (an "HC"). A concordance is an index where each of the indexed terms is listed with surrounding text, i.e., in context. As well, each of the indexed terms in the HC is given a hyperlink, instead of a page number, back to the occurrence of the term in a version of the indexed document. In one embodiment of the invention, the original document that has been indexed is also revised to include hyperlinks from the index terms into the HC.

17 Claims, 8 Drawing Sheets

OTHER PUBLICATIONS

Gibbs, Mark, "Liven up the LAN with hot new tools LAN World", Feb. 1996, Network World, pp. 1–2.*

FOLDOC homepage <http://wombat.doc.ic.ac.uk/>, published on May 1997, p. 1. <http://web.archive.org/web/19970506034149/http://wombat.doc.ic.ac.uk/>.*

FOLDOC "Operating system" <http://wombat.doc.ic.ac.uk/>, published on Jan. 1998, p. 2. <http://web.archive.org/web/199801211744 . . . /http://wombat.doc.ic.ac.uk/foldoc/contents/operatingsystem. html>.*

FOLDOC "Amoeba" <http://wombat.doc.ic.ac.uk/>, published on May 1997, p. 3. <http://web.archive.org/web/*/http://wombat.doc.ic.ac.uk/?Amoeba>.*

Uchihashi et al. "Automatic Index Creation for Handwritten Notes", Mar. 1999, IEEE International Conference on Acoustics, Speech, and Signal Processing, vol. 6, pp. 3453–3456.*

Grefenstette, Gregory, "Explorations in Automatic Thesaurus Discovery," Kluwer Academic Publishers, Boston, 1994, pp. i–xiv, 1–305.

Green, Stephen J., "Using Lexical Chains to Build Hypertext Links in Newspaper Articles," In AAAI 96 Workshop on Internet-based Information Systems, 1996, pp. 1–9 (hand-annotated).

Fred J. Damerau, "Generating and Evaluating Domain-Oriented Multi-Word Terms from Texts," Information Processing & Management vol. 29, No. 4, pp. 433–447, 1993.

John S. Justeson and Slava M. Katz, "Technical Terminology: Some Linguistic Properties and an Algorithm for Identification in Text," Natural Language Engineering vol. 1, Part 1, pp. 9–27, 1995.

Julian Kupiec, Jan Pedersen and Francine Chen, "A Trainable Document Summarizer," Proceedings of the 18th Annual Intl. ACM SIGIR Conference on Research and Development in Information Retrieval, pp. 68–73, 1995.

Frank Smadja, "Retrieving Collocations from Text: Xtract," Computational Linguistics vol. 19, No. 1, pp. 143–177, 1993.

Kenneth Ward Church and Patrick Hanks, "Word Association Norms, Mutual Information, and Lexicography," Proceedings of the 27th Annual Meeting of the Association for Computational Linguistics, PP. 76–83, 1989.

Ted Dunning, "Accurate Methods for the Statistics of Surprise and Coincidence," Computational Linguistics vol. 19, No. 1, pp. 61–74, 1993.

Kenneth Ward Church, "One Term or Two?" SIGIR '95, pp. 310–318, 1995.

Christian Jacquemin, "FASTR: A Unification–Based Front–End to Automatic Indexing," RIAO 94 Conference Proceedings vol. 1, pp. 34–47, 1994.

James Pustejovsky, Sabine Bergler, and Peter Anick, "Lexical Semantic Techniques for Corpus Analysis," Computational Linguistics vol. 19, No. 2, pp. 331–358, 1993.

Hiroshi Nakagawa and Tatsunori Mori, "Nested Collocation and Compound Noun for Term Extraction," Computerm '98 First Workshop on Computational Terminology, pp. 64–70, 1998.

Ian C. Ross and John W. Tukey, "Index to Statistics and Probability: Permuted Titles, A—Microbiology," R&D Press, pp. iv–x, 1975.

Didier Bourigault, "An Endogeneous Corpus–Based Method for Structural Noun Phrase Disambiguation," Proc. of EACL, pp. 81–86, 1993.

M.H. Andersen, J. Nielsen, and H. Rasmussen, "A Similarity–Based Hypertext Browser for Reading the UNIX Network News," Hypermedia, vol. 1(3), pp. 255–265, 1989.

Roberto Basili, Fabrizio Grisoli, and Maria Teresa Pazienza, "Hirma: Hypertextual Information Retrieval System Managed by Ariosto," Data and Knowledge Engineering, vol. 17(3), pp. 187–213, 1995.

W. Bruce Croft and Howard Turtle, "A Retrieval Model for Incorporating Hypertext Links," In Proc. Of Hypertext, pp. 213–224, 1989.

Donald B. Crouch, Carolyn J. Crouch, and Glenn Andreas, "The Use of Cluster Hierarchies in Hypertext Information Retrieval," In Proc. of Hypertext, pp. 225–237, 1989.

Dennis E. Egan, Joel R. Remde, Louis M. Gomez, Thomas K. Landauer, Jennifer Eberhardt, and Carol C. Lochbaum, "Formative Design–Evaluation of Superbook," ACM TOIS, vol. 7(1), pp. 30–57, 1989.

David A. Evans and Chengxiang Zhai, "Noun–Phrase Analysis in Unrestricted Text for Information Retrieval," In Proc. Of ACL, pp. 17–24, 1996.

H.P. Frei and D. Stieger, "The Use of Semantic Links in Hypertext Information Retrieval," IP&M, vol. 31(1), pp. 1–13, 1994.

Gene Golovchinsky, "Queries? Links? Is There a Difference?," In Proc. Of CHI 97, pp. 407–414, 1997.

Sadao Kurohashi, Makoto Nagao, Satoshi Sato, and Masahiko Murakami, "A Method of Automatic Hypertext Construction from an Encyclopedic Dictionary of a Specific Field," In Proc. Of ANLP 3, pp. 239–240, 1992.

Craig G. Nevill–Manning, Ian H. Witten, and Gordon W. Paynter, "Browsing in Digital Libraries: A Phrase–Based Approach," In Proc. Of ACM DigLib, pp. 230–236, 1997.

G. Salton, J. Allan, C. Buckley, and A. Singhal, "Automatic Analysis, Theme Generation and Summarization of Machine–Readable Texts," Science, vol. 264, pp. 1421–1426, 1994.

Alan F. Smeaton and Patrick J. Morissey, "Experiments on the Automatic Construction of Hypertext from Texts," The New Review of Hypermedia and Multimedia, vol. 1, pp. 23–39, 1995.

Tomek Strzalkowski, "Natural Language Information Retrieval," IP&M, vol. 31(3), pp. 397–417, 1995.

* cited by examiner

Results

Hypertext Concordance
- index.hc.htm —302

Index Files
- filename1.hcd.htm ⎫
- filename2.hcd.htm ⎬ 304
- filename3.hcd.htm ⎭

FIG. 3

Index Terms

ABC . aggregate amount . agreement dated . alpha assurances . amount beneficially . amounts due . amounts owed . annual report . Anytown . appropiate box . assurance mutuelle . assurances vic . beneficial ownership . beneficially . beneficially owned . business address . business phone . canada inc. capital stock . central index . check box . class represented . classification . companies incorporated . conformed name. conversion . conversion agreement . convert . convertible. corporate seal . dated march . debentures . dispositive . duly . duly authorized . ended november . enhanced message . equitable companies . europe assurance . excludes certain . executive officers . exhibit . file number . filing values . filing out . foregoing . form type . group members . ie . indemnification . index key . industrial classification . inure . icx number . letter agreement . long ridge . mutuelle . note dated . officers named . opinon letter . originator . owing . preferred stock . present principal . principal amounts . principal executive . promissory . promissory note . pursuant . registrant . schedule A . sec use . sec instructions . sec note . shared voting . shared dispositive . sole voting . sole dispositive . stamford . standard industrial . transferable . undersigned . unit . units . unpaid interest . unpaid dividends . valuable consideration . vie mutuelle . waiting period . xerographic . xeroxx . $xxx,xxx

FIG. 5

<description> xerox conversion agreement dated march 2, 1994
<text> exhibit (6)

ABC Company
2 Main Street
Anytown, USA 12345 march 2, 1994

Xerox Corporation
800 Long Ridge Road
Stamford, Connecticut 06903

Attention: Mr. John E. Doe

Re: conversion to ABC Company capital stock

Dear John:

This letter will confirm the terms and conditions upon which Xerox Corporation ("Xerox") agrees to convert any and all amounts owed by ABC Company ("ABC") under certain notes described on schedule A annexed hereto, executed and delivered on behalf of ABC to Xerox (the "debentures"), to shares of convertible preferred stock of ABC. Specifically, in consideration of the obligations of ABC set forth herein, as well as other good and valuable consideration, the receipt and sufficiency of which are hereby acknowledged, Xerox hereby agrees to convert any and all principal amounts (namely, $xxx, xxx), together with any and all accrued but unpaid interest thereon, due and owing under the

FIG. 7

HYPERTEXT CONCORDANCE

SUMMARY OF THE INVENTION

A system and method in accordance with an embodiment of the invention addresses the problems of unlinked or sparsely linked documents by linking them using a set of automatically extracted content words, the "index terms." Upon receiving a list of documents for indexing, the system and method in accordance with an embodiment of the invention automatically selects the terms to be indexed and generates a hypertext concordance (an "HC"). A concordance is an index where each of the indexed terms is listed with surrounding text, i.e., in context. As well, each of the indexed terms in the HC is given a hyperlink, instead of a page number, back to the occurrence of the term in a version of the indexed document. In one embodiment of the invention, the original document that has been indexed is also revised to include hyperlinks from the index terms into the HC.

BRIEF DESCRIPTION OF THE DRAWINGS

The invention will be described with respect to particular embodiments thereof, and reference will be made to the drawings, which are not necessarily drawn to scale, and in which:

FIG. 3 shows an example of a display indicating results to a user in an embodiment of the invention;

FIG. 5 is an example display screen showing an index term list in accordance with the invention;

FIG. 7 shows an example HCD in accordance with an embodiment of the invention.

DETAILED DESCRIPTION

Figure 1:
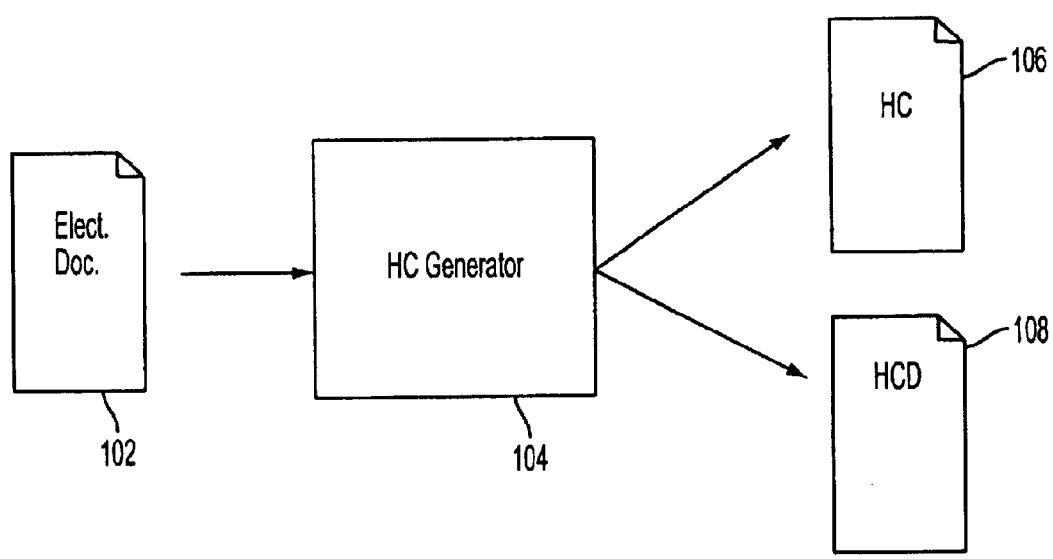
FIG. 1 is a generalized block diagram illustration of the documents input into and output from a system in accordance with an embodiment of the invention.

A system and method that allows a user to more readily access the information in documents lacking hyperlinks is disclosed. More specifically, as illustrated in FIG. 1, a document 102 that has been specified by a user for indexing is input into an HC (a "Hypertext Concordance") generator 104. The HC generator is implemented in software in one embodiment, although embodiments done in firmware, software, hardware, or any combination thereof are also foreseeable. The HC generator outputs two documents: (1) the HC itself 106, having the indexed terms listed in concordance format, and (2) a version 108 of the original document 102 revised to include links into the HC from the indexed terms. The revised document 108 is hereafter referred to as the "HC document" or the HCD."

Figure 6:
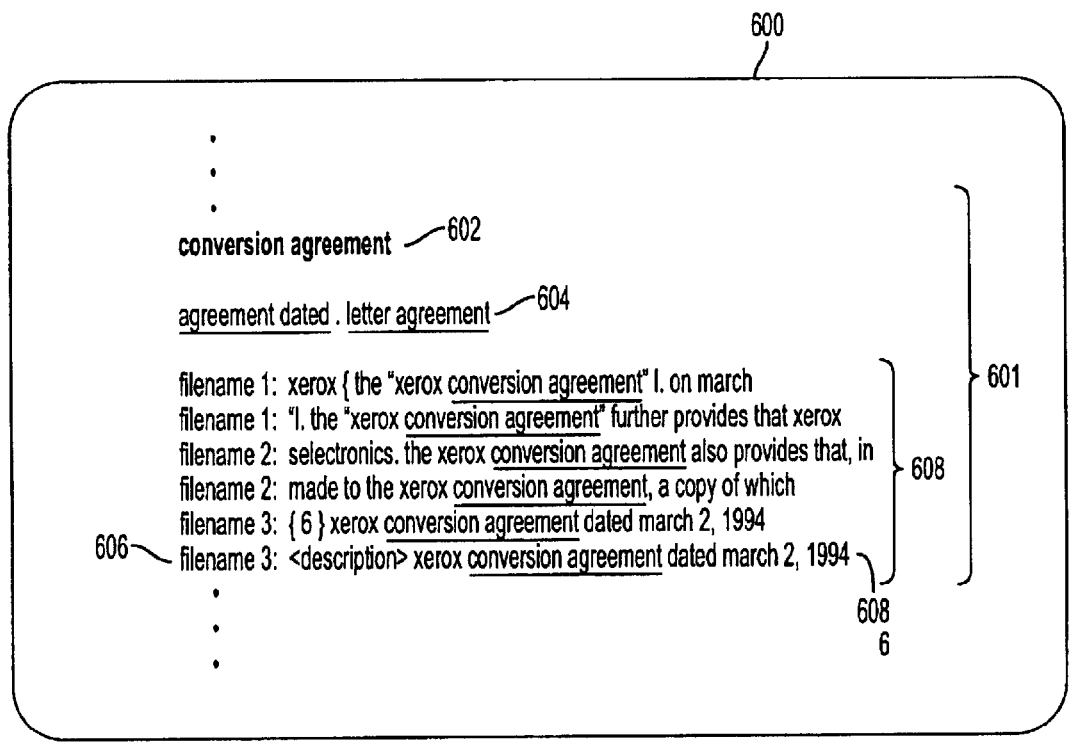
FIG. 6 is an example display screen showing a portion of a concordance listing in accordance with an embodiment of the invention.

An example of a concordance listing 601 for an HC in accordance with the invention is shown in FIG. 6 for the term "conversion agreement." FIG. 6 shows the term "conversion agreement" at 602 followed by several lines 608 of text. Each line of text contains the term "conversion agreement" in context, which in this example is four words to the left of the term and four words to the right (note that in this example, certain punctuation marks are deemed a single word). Each occurrence of the term "conversion agreement" is also hyperlinked into the HCD, so that a user who points to and clicks on a particular occurrence of the term in the concordance listing will instantly be brought to the selected occurrence of the term in the text of the indexed document. Hyperlinks are represented in FIG. 6 by underlining the hyperlinked term, as is commonly done in the art. Of course other methods for designating a hyperlink will also be acceptable, e.g., denoting a hyperlinked term in a different color, etc.

Figure 2:
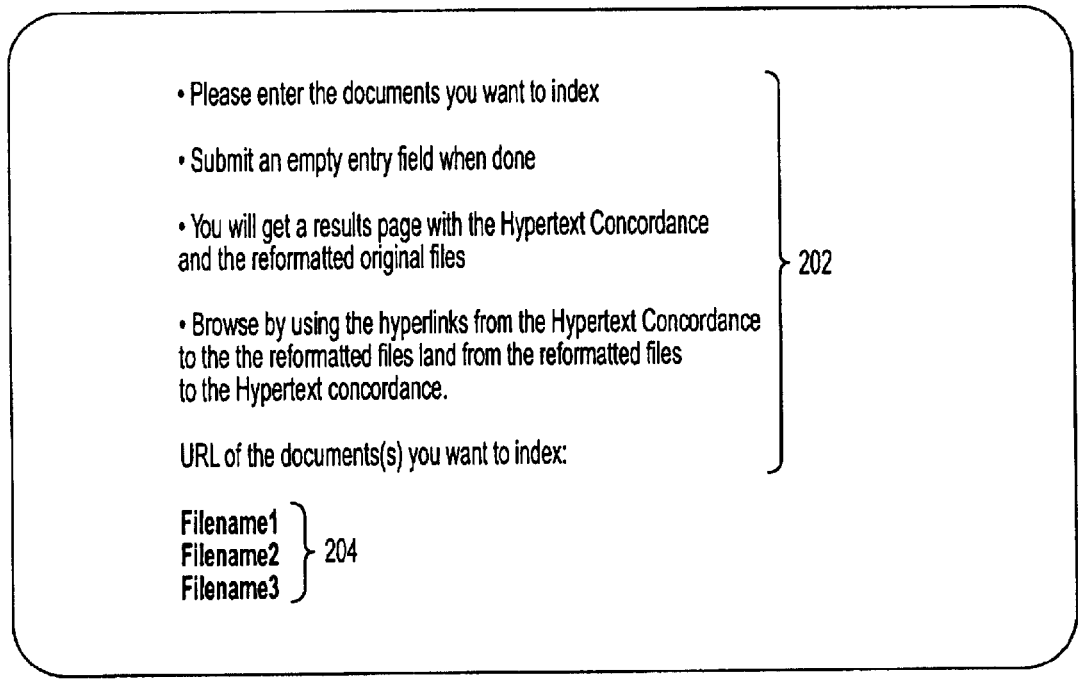
FIG. 2 shows an example of a user prompt display screen in accordance with an embodiment of the invention.

Referring to FIG. 2, in accordance with an embodiment of the invention, a user is prompted at 202 (from a computer display) to enter one or more URLs (uniform resource locators) of websites that are to be indexed and/or to enter the file names of other electronically stored documents. Although the indexing of websites is often referred to herein, it is to be understood that the concepts described herein will apply equally to non-web page documents, provided that such documents are electronically stored, or if the documents are paper documents, that they are first scanned and undergo optical character recognition (OCR), thereby transferring them into electronic documents. At 204, the user enters one or more file names or URLs, here designated Filename1, Filename2, and Filename3.

Once the files names or URLs have been specified, the HC Generator 104 automatically analyzes the documents and extracts the index terms. The index terms can be selected by any of a variety of methods. One method used in an embodiment of the invention is Damerau's method described in Damerau, "Generating and Evaluating Domain-Oriented Multi-Word Terms From Text," *Information Processing and Management*, Vol. 29, No. 4, pp. 433–447 (Pergamon Press Ltd. 1993), incorporated by reference herein. Using Damerau's method, the terms are automatically selected by comparing their in-document frequency with their frequency in general English, as derived from a reference corpus such as a newspaper text. In many embodiments, both words and two-word phrases are considered. Some embodiments may also consider phrases with more than two words and non-contiguous phrases. The system will compare the relative frequencies of words and phrases in the documents to be indexed ($coll_1$) and the relative frequencies of words and phrases in a reference collection ($coll_2$), such that $$score(word j) = \frac{f(word j, coll_1)}{f(coll_1)} \div \frac{f(word j, coll_2)}{f(coll_2)}$$

where $f(word_j, coll_i)$ is the frequency of the word j in collection i, and $f(coll_i)$ is the number of substantive words in collection i. In one embodiment, the reference collection is taken from all issues of The New York Times from 1990, which is a sufficiently broad corpus to model frequencies of words in general English well. The words and phrases in the submitted (input) documents are scored and ranked according to the ratio of the frequency of the words/phrases in the submitted (input) documents and the frequency of the words/phrases in the referenced text. The top n terms are selected as the index terms (e.g., n=200), which are generally those terms that occur significantly more often in the documents of interest than in the reference corpus. In many embodiments of the invention, words found in a stop list, which contains common words that are generally without much substance, such as articles, pronouns, etc., are excluded from the ranking.

As will be understood by those of skill in the art many other methods of selecting index terms are available. The following is a list of other methodologies known:

1. Selection according to raw frequency within a text, sometimes with part-of-speech prefilters or postfilters. Ross and Tukey, "Index to Statistics and Probability," pps. iv–x, (R&D Press 1975); Justeson and Katz, "Technical Terminology: Some Linguistic Properties and an Algorithm for Identification in Text." *Natural Language Engineering*, 1(1):9–27 (1995), Kupiec, Pedersen, and Chen, "A Trainable Document Summarizer," *Proceedings of the 18th Annual International ACM SIGIR Conference*, pps. 68–73 (1995).
2. Selection according to low variance in relative position (that is if two words occur at a fixed distance from each other whenever they co-occur, they are likely to be terminology). Smadja, "Retrieving Collocations from Text: Xtract," *Computer Linguistics*, 19(1):143–177 (1993).
3. Hypothesis testing and mutual information. Church and Hanks, "Word Association Norms, Mutual Information and Lexicography," *Proceedings of the 27th Annual Meeting of the Association for Computational Linguistics*, pps. 76–83, (1989).
4. Likelihood ratios within a text assuming a bi-nomial distribution. Dunning, "Accurate Methods for the Statistics of Surprise and Coincidence." *Computer Linguistics*, 19(1):61–74, (1993).
5. Residual idf Assuming a Poisson Distribution. Church, "One Term or Two?", *Proceedings of the 18th Annual Int'l ACM SIGIR Conference*, pps. 310–318 (1995).
6. Finding index terms based on finite-state automaton parsing. Grefenstette, *Explorations in Automatic Thesaurus Discovery* (Kluwer Academic Press, 1994).
7. Finding index terms based on full parsing. Bourigault, "An Endogeneous Corpus-Based Method for Structural Noun Phrase Disambiguation," *Proceedings of EACL*, pps. 81–86 (1993); Jacquemin, "FASTR: A Unification-Based Front-End to Automatic Indexing," *Proceedings of Recherche d'Information assistèe par Ordinateur (RIAO)*, pps. 34–47 (1994); Strzalkowski, "Natural Language Information Retrieval," IP&M, 31(3):397–417(1995).
8. Terminology extraction based on deeper semantic analysis and theory. Pustejovsky et al., "Lexical Semantic Techniques for Corpus Analysis, *Computer Linguistics*, 19(2):331–358 (1993).
9. Identifying boundaries of terminological phrases as points where the uncertainty of predicting the previous or next word is highest. Nakagawa and Mori, "Nested Collocation and Compound Noun for Term Extraction," *Proceedings of First Workshop in Computational Terminology* (1998).

Nonetheless, Damerau's method is often preferable to those listed above because it uses an additional source of information instead of simply looking at the document of interest. Damerau's method can also be applied to very short documents while many of the above-mentioned methods require large collections to be effective.

Referring now to FIG. 3, once the index terms have been extracted and the HC and HCD built (as described more below), a system in accordance with the invention displays a results page to the user. Shown on the results page is a file name 302 for the HC 106, and a list 304 of the resulting HCD files, which have been derived from the files that were originally submitted by the user. In many embodiments, even if more than one file was input by a user, only one HC will be output, although each of the submitted files will have its own HCD.

Figure 4:
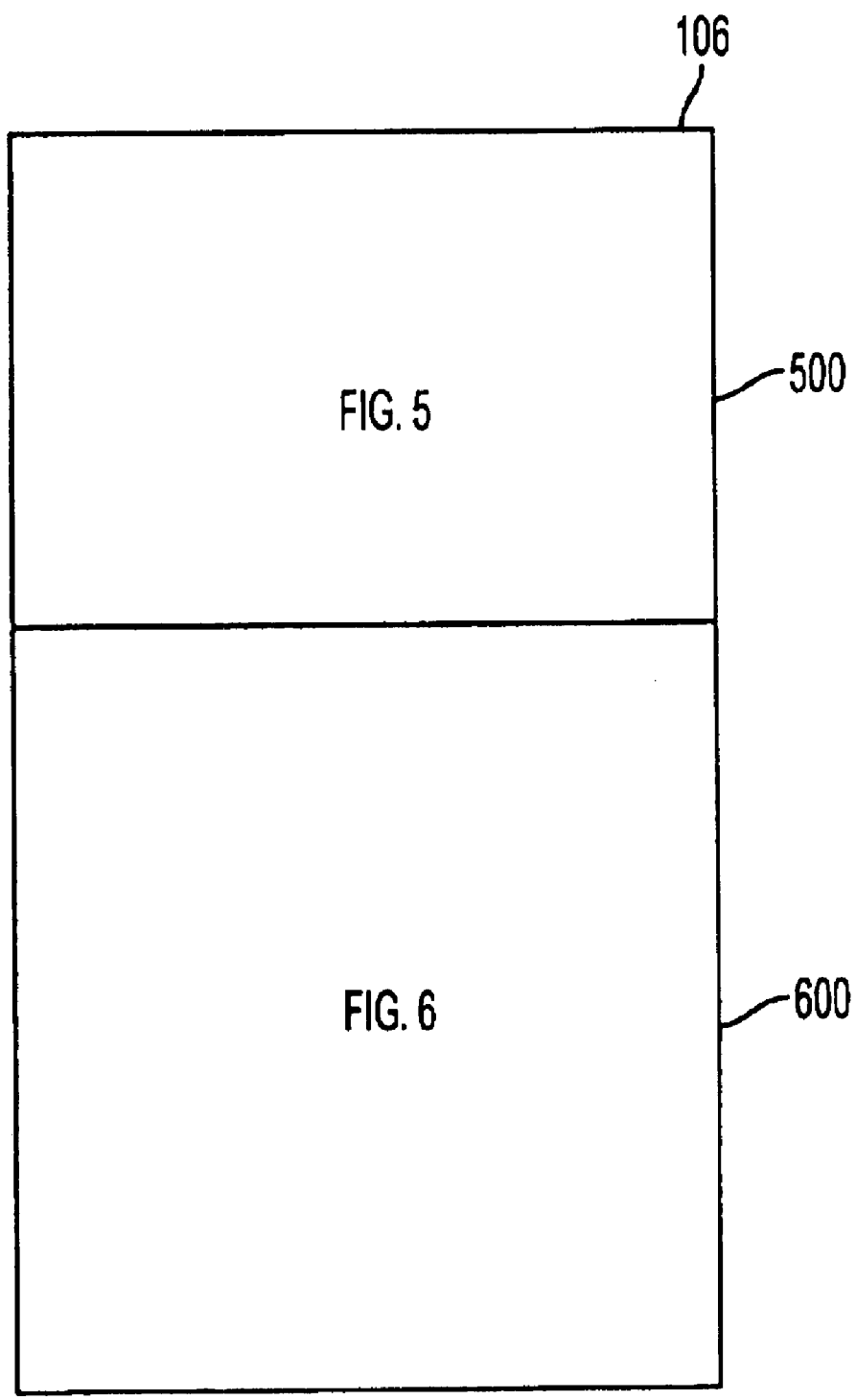
FIG. 4 is a generalized block diagram showing an HC in accordance with an embodiment of the invention.

FIG. 4 shows an embodiment of the HC 106 as divided into two parts: the first part is an index term list 500, and the second part is a concordance 600. The index term list will be described with respect to FIG. 5, and the concordance will be described with respect to FIG. 6.

FIG. 5 shows an example of an index term list 500 that forms the first part of the HC 106 in some embodiments of the invention. All of the terms extracted from the submitted documents are listed in alphabetical order. In many embodiments of the invention, the listed index terms are each hyperlinked to the beginning of the respective entry in concordance 600 (shown in FIG. 6). For instance, by clicking on the term "conversion agreement" in the listing of FIG. 5, the user will be brought to the concordance listing 601 for the entry for "conversion agreement." Although an index term list 500 is desirable to aid the user in navigating to the most relevant terms, enabling the user to quickly jump to any term—even those not currently in the user's view—many embodiments of the invention do not need to include such an index term list.

FIG. 6 illustrates a concordance 600, the second part of the HC 106. Only the listing for a single term, "conversion agreement," is shown, but it is to be understood that there will be many other terms, which will typically appear in alphabetical order. As shown, the concordance listing 601 in accordance with one embodiment of the invention has several parts. First, the index term 602 is listed. Links to other indexed terms 604 that share words with the index term are also listed. For instance as shown in FIG. 6, the terms "agreement dated" and "letter agreement" are listed, both sharing the word "agreement" with the two-word term "conversion agreement." Then, each line 608 shows each occurrence of the index term in context. Although the number of words shown surrounding each index term is eight (four preceding and four succeed the term), other embodiments will have a different number of words supplied as context or will have phrases based as linguistic analysis (instead of a fixed number of words to the left and right). At the beginning of each context listing appears a document identifier 606, indicating the document to which the occurrence of the term belongs. Each occurrence of the indexed term is also hyperlinked to the indexed document. By clicking on the index term in the concordance line, the user is immediately brought to the occurrence of the term in the indexed document. For instance, by clicking on "conversion agreement" in concordance line 608$_6$ the user will be displayed the portion of the document, shown in FIG. 7, containing the line <description> Xerox conversion agreement dated Mar. 2, 1994.

In a similar manner, in an embodiment of the invention, the indexed document is revised to include hyperlinks back into the concordance HC. For instance, clicking on the term "conversion agreement" on the first line of the document displayed in FIG. 7, will bring the user back to the concordance listing 601, and particularly to line 608$_6$. Nonetheless, some embodiments do not generate an HCD 108, i.e., a document including hyperlinks back into the HC. In some embodiments, links from the HC simply bring the user into the original, unrevised document to the extent the original document has hyperlink anchors in the appropriate locations.

Figure 8:
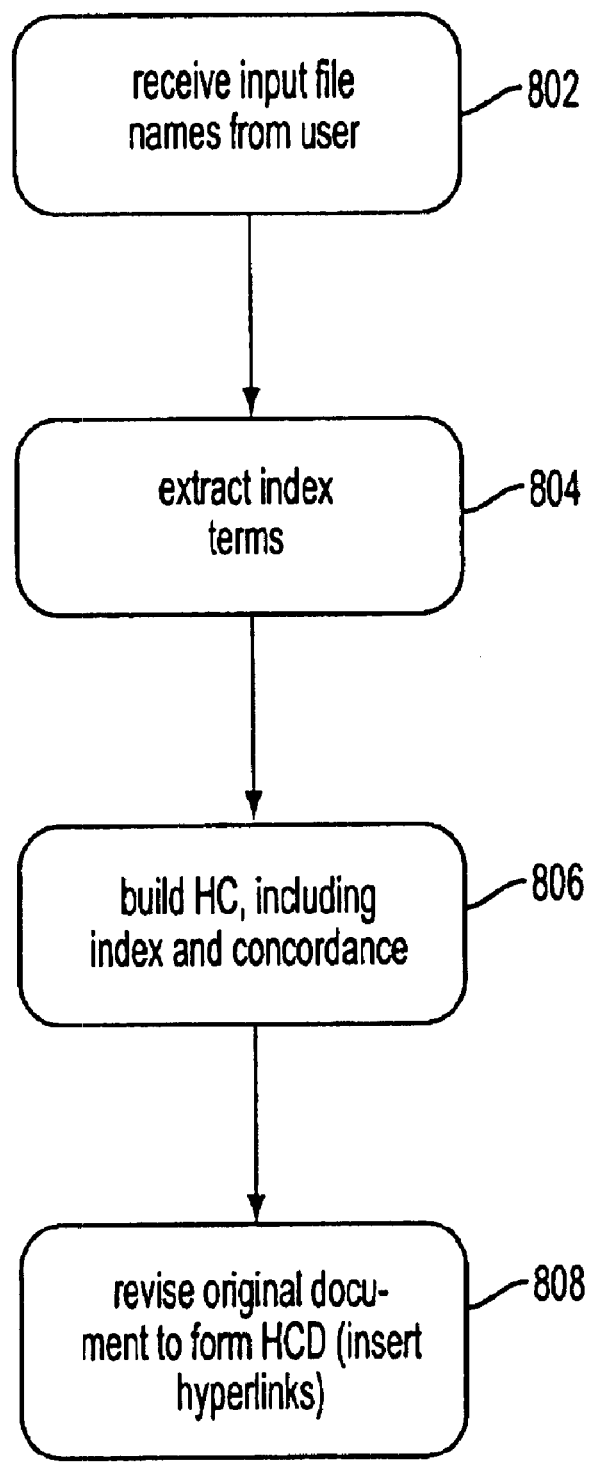
FIG. 8 shows a flow diagram illustrating the steps of a method in accordance with an embodiment of the invention.

A summary of all the steps taken in accordance with an embodiment of the invention are described with respect to the flow chart of FIG. 8. In step 802, the system receives a listing of documents to be indexed from the user. In step 804, the system and method in accordance with the invention extracts index terms, for instance, using Damerau's method. All words and word pairs (bi-grams) are considered except for those contained in a stop list. The top n terms are selected according to the likelihood ratio.

In step 806, a system in accordance with the invention generates the HC 106. To do so, the system retrieves the context surrounding each index term and generates concordance lines 608 with hypertext links into the original document or a revised version thereof. In many embodiments of the invention, in step 808, an HCD is formed, a revised version of the original document that includes hyperlinks from each of the index terms back into the concordance. Of course, the order of the steps listed in FIG. 8 may be varied as would be understood by those of skill in the art.

Hence, a system and method has been disclosed that allows a user to more readily access the information in non-hyperlinked documents, including web pages and other electronically stored documents. The HC is useful for lookup, similar to the traditional use of a book index, but page numbers (and the labor of finding them) are unnecessary since hyperlinks are used. Moreover, because entries of terms are given with context, the user can more easily identify the use of the word he or she is looking for. As well as look-up, the HC is also useful for browsing. The user can use a standard browser to browse the transformed document collection, either starting from the index or from the transformed document.

It should be understood that the particular embodiments described above are only illustrative of the principles of the present invention, and various modifications could be made by those skilled in the art without departing from the scope and spirit of the invention.

What is claimed is:

1. A method for creating an index of words and phrases for one or more web pages, comprising:
   receiving, from a user, a list of web page names for indexing;
   automatically selecting words and phrases from web pages identified by the web page names;
   creating an index having a concordance section and creating new versions of the web pages,
      wherein the concordance section includes a contextual listing for each occurrence of each of the selected words and phrases, wherein each contextual listing includes a hyperlink to the occurrence of the selected word or phrase in the new versions of the web pages, and
      wherein the new versions of the web pages include, for each occurrence of each selected word or phrase, a hyperlink to the contextual listing of the occurrence of the selected word or phrase in the concordance section, wherein at least one of the selected words or phrases has at least two occurrences in the new versions of the web pages.

2. The method of claim 1, wherein receiving, from a user, a list of web page names for indexing includes receiving one web page name for indexing.

3. A method for creating an index of terms for an electronically stored document, comprising:
   automatically selecting index terms from the electronically stored document;
   creating an index of the selected index terms, the index having a concordance section, the concordance section including a contextual listing for each occurrence of each of the selected index terms, wherein each contextual listing includes a hyperlink to the occurrence of the selected index term in a version of the electronically stored document;
   creating a new version of said electronically stored document, said new version including, for each occurrence of each selected index term, a hyperlink to the contextual listing of the occurrence of the selected index term in the concordance section, wherein at least one of the selected index terms has at least two occurrences in said new version of said electronically stored document, and
   wherein, in said contextual listing, said hyperlink to the occurrence of the selected index term is a hyperlink to the occurrence of the selected index term in said new version of said electronically stored document.

4. The method of claim 3, wherein said index further includes a selected-index-term-list section, said selected-index-term-list section including an alphabetical listing of each of the selected index terms, wherein each index term in the alphabetical listing includes a hyperlink to the selected index term in the concordance section.

5. The method of claim 3, wherein automatically selecting index terms includes utilizing a Damerau method.

6. A computer readable medium having a set of instructions stored therein, which when executed by at least one computer performs the steps of:
   prompting a user to enter an identifier for an electronically stored document;
   automatically selecting index terms from the electronically stored document;
   creating an index having a concordance section of the selected index terms, the concordance section including a contextual listing for each occurrence of each of the selected index terms, wherein each contextual listing includes a hyperlink to the occurrence of the selected index term in a version of the electronically stored document;
   creating a new version of said electronically stored document, said new version including, for each occurrence of each selected index term, a hyperlink to the contextual listing of the occurrence of the selected index term in the concordance section, wherein at least one of the selected index terms has at least two occurrences in said new version of said electronically stored document, and
   wherein, in said contextual listing, said hyperlink to the occurrence of the selected index term is a hyperlink to the occurrence of the selected index term in said new version of said electronically stored document.

7. The computer readable medium of claim 6, wherein said index further includes a selected-index-term-list section, said selected-index-term-list section including an alphabetical listing of each of the selected index terms, wherein each alphabetical listing includes a hyperlink to the selected index term in the concordance section.

8. The method of claim 6, wherein the instructions for performing the step of automatically selecting index terms includes instructions for utilizing a Damerau method.

9. A system used to create an index of terms for an electronically stored document, comprising:
   means for automatically selecting index terms from the electronically stored document;
   means for creating an index of the selected index terms, the index having a concordance section including a contextual listing for each occurrence of each of the selected index terms, wherein each contextual listing includes a hyperlink to the occurrence of the selected index term in a new version of the electronically stored document; and means for creating the new version of the electronically stored document, the new version of the electronically stored document including, for each occurrence of each selected index term, a hyperlink to the contextual listing of the occurrence of the selected index term in the concordance section, wherein at least one of the selected index terms has at least two occurrences in the new version of the electronically stored document.

10. A method for creating an index of terms for a document, comprising:

transforming the document into an electronically stored document;

automatically selecting index terms from the electronically stored document;

creating an index of the selected terms, the index having a concordance section, the concordance section including a contextual listing for each occurrence of each of the selected terms, wherein each contextual listing includes a hyperlink to the occurrence of the selected index term in a version of the electronically stored document;

creating a new version of the electronically stored document, the new version including, for each occurrence of each selected index term, a hyperlink to the contextual listing of the occurrence of the selected index term in the concordance section, wherein at least one of the selected index terms has at least two occurrences in the new version of the electronically stored document, and wherein, in the contextual listing, the hyperlink to the occurrence of the selected index term is a hyperlink to the occurrence of the selected index term in the new version of the electronically stored document.

11. The method of claim 10, wherein said document is a paper document and wherein transforming the document into an electronically stored document includes scanning said paper document and performing optical character recognition (OCR) on the scanned document.

12. A method for creating an index of terms for at least one electronically stored document, comprising:

automatically selecting index terms from the at least one electronically stored document;

creating an index of the selected index terms, the index having a concordance section, the concordance section including a contextual listing for each occurrence of each of the selected index terms in the at least one electronically stored document, wherein each contextual listing includes a hyperlink to the occurrence of the selected index term in a version of the at least one electronically stored document; and creating a new version of the at least one electronically stored document, the new version including, for each occurrence of each selected index term, a hyperlink to the contextual listing of the occurrence of the selected index term in the concordance section, wherein at least one of the selected index terms has at least two occurrences in the new version of the at least one electronically stored document.

13. The method of claim 12, wherein, in said contextual listing, the hyperlink to the occurrence of the selected index term is a hyperlink to the occurrence of the selected index term in the new version of the at least one electronically stored document.

14. The method of claim 12, wherein the at least one electronically stored document includes two electronically stored documents, and creating a new version includes creating new versions of the two electronically stored documents.

15. A method for creating an index of terms for at least one electronically stored document, comprising:

automatically selecting index terms from the at least one electronically stored document;

creating an index of the selected index terms, the index having a concordance section, the concordance section including a contextual listing for each occurrence of each of the selected index terms in the at least one electronically stored document, wherein each contextual listing includes a hyperlink to the occurrence of the selected index term in a version of the at least one electronically stored document; and creating a new version of the at least one electronically stored document, the new version including, for each occurrence of each selected index term, a hyperlink to the contextual listing of the occurrence of the selected index term in the concordance section, wherein multiple occurrences of each selected word or phrase in the new version of the at least one electronically stored document are each capable of being hyperlinked to the contextual listing.

16. The method of claim 15, wherein said contextual listing, said hyperlink to the occurrence of the selected index term is a hyperlink to the occurrence of the selected index term in the new version of the at least one electronically stored document.

17. A system used to create an index of terms for at least one electronically stored document, comprising:

means for automatically selecting index terms from the at least one electronically stored document;

means for creating an index of the selected index terms, the index having a concordance section including a contextual listing for each occurrence of each of the selected index terms, wherein each contextual listing includes a hyperlink to the occurrence of the selected index term in a version of the at least one electronically stored document; and means for creating a new version of the at least one electronically stored document, the new version of the at least one electronically stored document including, for each occurrence of each selected index term, a hyperlink to the contextual listing of the occurrence of the selected index term in the concordance section, wherein multiple occurrence of each selected word or phrase in the new version of the electronically stored document are each capable of being hyperlinked to the contextual listing.

* * * * *